(12) United States Patent
Rosenberg et al.

(10) Patent No.: US 8,496,193 B2
(45) Date of Patent: Jul. 30, 2013

(54) FLUID CONTROL DEVICES PARTICULARLY USEFUL IN DRIP IRRIGATION EMITTERS

(76) Inventors: Gideon Rosenberg, Kiryat Tivon (IL); Avner Rosenberg, Moshav Beit SheArim (IL)

( * ) Notice: Subject to any disclaimer, the term of this patent is extended or adjusted under 35 U.S.C. 154(b) by 596 days.

(21) Appl. No.: 12/729,477

(22) Filed: Mar. 23, 2010

(65) Prior Publication Data

US 2010/0237170 A1    Sep. 23, 2010

Related U.S. Application Data

(60) Provisional application No. 61/210,664, filed on Mar. 23, 2009.

(51) Int. Cl.
*B05B 15/00* (2006.01)

(52) U.S. Cl.
USPC ........... 239/542; 239/106; 239/116; 239/123; 239/547; 239/570; 239/602; 138/42

(58) Field of Classification Search
USPC ................. 239/104, 106, 114, 115, 116, 123, 239/533.1, 542, 547, 570, 571, 602; 137/533; 138/42, 43
See application file for complete search history.

(56) References Cited

U.S. PATENT DOCUMENTS

| | | | | |
|---|---|---|---|---|
| 3,777,980 A | * | 12/1973 | Allport | ......................... 239/542 |
| 4,011,893 A | | 3/1977 | Bentley | |
| 4,084,749 A | * | 4/1978 | Drori | ............................... 138/42 |
| 4,288,035 A | * | 9/1981 | Rosenberg | .................... 239/542 |
| 4,660,769 A | * | 4/1987 | Rosenberg | .................... 239/542 |
| 4,682,730 A | | 7/1987 | Smeyers | |
| 5,279,462 A | * | 1/1994 | Mehoudar | .................... 239/547 |

OTHER PUBLICATIONS

Office Action Dated Dec. 3, 2012 From the Israel Patent Office Re. Application No. 204685 and Its Translation Into English.

* cited by examiner

*Primary Examiner* — Steven J Ganey (57) ABSTRACT

A fluid flow control device, particularly useful for drip-irrigation emitters, for controlling the discharge of a fluid (water) from a discharge port in a fluid conduit (drip irrigation pipe) includes: a housing attachable to the fluid conduit and constructed to define a fluid chamber having an inlet opening communicating with the interior of the fluid conduit, and an outlet opening communicating with the discharge port of the fluid conduit; and a flow control member freely movable within the fluid chamber and having a surface contacting an inner surface of the housing to control the flow of fluid from said fluid chamber out of the fluid conduit via said outlet opening in the housing. One of the contacting surfaces of the flow control member or housing is formed with a protruding pattern such that the two contacting surfaces define small passageways for the flow of fluid from the fluid chamber out of the fluid conduit via the outlet opening. The flow control member is manually accessible, via the outlet opening, to be manually moved away from the outlet opening in the fluid chamber and thereby to flush the small passageways of any clogging particles.

17 Claims, 5 Drawing Sheets

FIG. 8

FLUID CONTROL DEVICES PARTICULARLY USEFUL IN DRIP IRRIGATION EMITTERS

RELATED APPLICATION/S

This application claims the benefit of priority under 35 USC 119(e) of U.S. Provisional Patent Application No. 61/210,664 filed on Mar. 23, 2009, the contents of which are incorporated herein by reference in their entirety.

FIELD AND BACKGROUND OF THE INVENTION

The present invention relates to fluid flow control devices for controlling the discharge of a fluid from a discharge port in a fluid conduit. The invention is particularly useful in drip irrigation drippers included in a water irrigation pipe for controlling the flow of irrigation water to plants to be irrigated, and is therefore described below particularly with respect to such an application.

The present invention is especially useful in drip irrigation emitters that provide a very low flow-rate while operating under an ordinary range of line pressure. The emitters disclosed in the present application are capable of discharging a flow rate as low as 0.25 L of water per hour, whereas prior art drippers are generally not capable of achieving flow rates of less than 1.2 L per hour, under such line pressure. The present invention also provides a construction which allows manual flushing the emitter passageways when clogged by solid particles or other substances.

For many years, drip emitters have been used for delivering localized, low flow irrigation to the roots of plants. Directing water drops to the vicinity of each plant was proven effective to conserve water and also to prevent soil erosion. A variety of drip irrigation devices are available, mostly for operation under an ordinary range of line pressures which, for irrigation applications, is generally 1.5 to 4 bars, to produce emitting flow rates of 1.2 to 8 L/hr. Selection of an appropriate flow rate depends on the plants and the type of soil.

The evolution of drip irrigation led to the development of micro-drip systems designed for discharge rates below 0.3 L/hr. Various studies proved that in addition to its better water savings, the micro-drip method created a wider wetting bulb with better water/air ratio in the soil and no salinity in the root zone. In other words, micro-drip irrigation supplies water at a rate close to that of plant water uptake and therefore improves yields with reduced water losses by drainage below the root zone. An example of such a study is provided in Assouline, Cohen, Meerbach, Harodi and Rosner, "Microdrip Irrigation of Field Crops", *Soil Science Society of America Journal* 66:228-235 (2002).

Prior art micro-drip irrigation systems used very low water pressure, in the range of 0.1 to 0.3 bar, to reach the required low emitting rate. This was done by using either pressure reducers or a water tank located at the proper elevation over the ground. An example of a system operating at low pressure from a water tank is described in R. Golan et al U.S. Pat. No. 7,048,010. Another example, related to a micro-drip system operating with pulsator devices acting as pressure reducers, is disclosed in P. Rosenberg U.S. Pat. No. 5,353,993

Generally, in use, ordinary drip emitters are placed along water feed lines such as 16 or 20 mm PE (polyethylene) tubes. The emitters may be plugged into discharge ports in the tubes, or may be inserted inside the tubes during the manufacturing of the drip lines. In any event, to accomplish small emitting rates, ordinary drip emitters rely either on small orifices to limit the flow rate, or on a labyrinth path designed to reduce the water pressure and accordingly the emitted flow rate.

Simple orifice emitters often become clogged by particulates in the feed line, or by the formation of sediments. The orifice diameter is therefore the major reason that prevents prior art designs from achieving emitting flow rates in the micro-drip regime under ordinary pressure. Simple labyrinth emitters are mostly made with wider passageways. However, the restriction to flow along the labyrinth path does not create enough pressure drop as needed for the emitter to maintain a discharge in the micro-drip regime.

Some recent designs combined both the orifice and labyrinth techniques, together with a flexible membrane, to construct a pressure-compensated drip emitter for achieving better discharge uniformity along the lines. This design concept is based on creating a constant pressure difference across the membrane, wherein the direct line pressure forces the membrane to close the orifice, and a reduced pressure from the labyrinth forces the other side of the membrane to open the orifice. However, the orifice in this configuration is located in series with the labyrinth; therefore this design is still sensitive to clogging.

More recent designs include a self-cleaning feature in the pressure compensating drip emitter. This feature is mostly attained by introducing a labyrinth path to produce a reduced water flow, and flushing the orifice before the pressure-compensating membrane is deformed to the extent needed to close the orifice and to start the normal dripping mode. Examples of a pressure compensating emitters that uses a reduced-pressure water from the labyrinth to clean the orifice during initial pressurization of the irrigation line, are disclosed in Bolinis et al. U.S. Pat. No. 6,464,152 and in Miller U.S. Pat. No. 5,628,462. In the latter, emitter, during initial pressurization of the irrigation line while the membrane is only slightly deformed, the orifice is flushed with reduced-pressure water delivered from the restrictor or labyrinth. Unfortunately, the orifice is subject to clogging by particulate buildup that might also interfere with the membrane seal, and therefore the reduced pressure water may be ineffective for adequately cleaning the orifice and membrane.

OBJECTS AND BRIEF SUMMARY OF THE INVENTION

An object of the present invention is to provide a fluid flow control device, particularly useful as a drip-irrigation emitter, such that, when operating under normal pressure (1.5 to 4 bars), it is capable of emitting at a very low discharge rate which complies with the micro-drip performance (below 0.3 L/hr). Another object of the present invention is to provide a drip-irrigation emitter having a manual flushing arrangement, such that when operating under normal pressure, the manual flushing arrangement can be operated to flush the discharge passageways by a strong water jet actuated by the full water pressure in the supply tube. A further object of the present invention is to provide a micro-drip emitter which is easy to use and clean and which is relatively simple and inexpensive to manufacture.

The present invention enables the production of a drip-irrigation emitter of a novel construction designed with expandable water emitting passageways formed between two contacting surfaces having a pattern of ribs between their faces. The ribs protrude from one (or both) of the surfaces by only a few microns such that when said surfaces are pressed against each other, the dimensions of the passageways are just a few microns each, and the water discharge rate is accordingly very low. However, when the surfaces are moved apart, the passageways expand to much larger dimensions such that water jets can burst out and effectively flush clean any substance clogging the passageways. The fluid flow control device is thus able to perform the double function of (a) continuously restricting the fluid flow from the fluid chamber through the small passageways out through the outlet opening in the fluid conduit, and (b) whenever desired, enlarging the small passageways by manually pressing the manually-accessible flow control member inwardly of the fluid conduit to thereby clear the small passageways of any clogging material.

The present invention also provides a flow control device, particularly useful as a drip-irrigation emitter designed with a manual flushing arrangement accessible from the exterior of the emitter to manually move the contacting surfaces apart, thereby causing the passageways to move apart and to actuate flushing of the emitter.

The present invention further provides a drip emitter designed with at least one of the contacting surfaces made from an elastomeric material, such that the line pressure deforms the elastomeric material to decrease the total cross section of the passageways between these surfaces, and thereby introduces pressure compensation in the discharge rate.

According to a broad aspect of the present invention, there is provided a fluid flow control device for controlling the discharge of a pressurized fluid from a discharge port in a fluid conduit, comprising: a housing attachable to said fluid conduit and constructed to define a fluid chamber having an inlet opening communicating with the interior of said fluid conduit, and an outlet opening for discharging fluid from the fluid conduit; and a flow control member freely movable within said fluid chamber and having a surface contacting an inner surface of said housing to control the flow of fluid from said fluid chamber out of the fluid conduit via said outlet opening in the housing; characterized in that at least one of said contacting surfaces of the flow control member and housing is formed with a protruding pattern defining between the two contacting surfaces small passageways for the flow of fluid from the fluid chamber out through said outlet opening in the housing, and in that said flow control member is manually accessible, via said outlet opening in the housing, to be manually moved away from the other of said contacting surfaces and thereby to flush said passageways of any clogging particles.

Two embodiments of the invention are described below for purposes of example. In one embodiment, the housing is attachable to the external surface of the fluid conduit to define an off-line irrigation emitter. In a second described embodiment, the housing is attachable to the internal surface of the fluid conduit to define an in-line or integral irrigation emitter.

In both embodiments, the fluid control device is preferably a disc integrally formed with a stem passable through, or accessible through, the discharge port of the fluid conduit, to permit manual flushing of the passageways of any particles accumulating therein.

As will be described more particularly below, such a fluid control device, and particularly such a drip irrigation emitter, provides advantages in one or more of the above respects, namely in enabling very small flow rates, and convenient manual flushing of the small passageways, to be achieved.

Further advantages and advantages of the invention will be apparent from the description below.

BRIEF DESCRIPTION OF THE DRAWINGS

The invention is herein described, by way of example only, with reference to the accompanying drawings, wherein.

It is to be understood that the foregoing drawings, and the description below, are provided primarily for purposes of facilitating understanding the conceptual aspects of the invention and possible embodiments thereof, including what is presently considered to be a preferred embodiment. In the interest of clarity and brevity, no attempt is made to provide more details than necessary to enable one skilled in the art, using routine skill and design, to understand and practice the described invention. It is to be further understood that the embodiments described are for purposes of example only, and that the invention is capable of being embodied in other forms and applications than described herein.

DESCRIPTION OF PREFERRED EMBODIMENTS

As indicated earlier, while the invention is applicable to various types of fluid control devices for controlling the discharge of a fluid from a discharge port in a fluid conduit, it is particularly useful, and is therefore described below, with respect to drip irrigation emitters for controlling the flow of irrigation water from a water irrigation pipe to field plants to be irrigated.

The Embodiment of FIGS. 1-5

Figure 1:
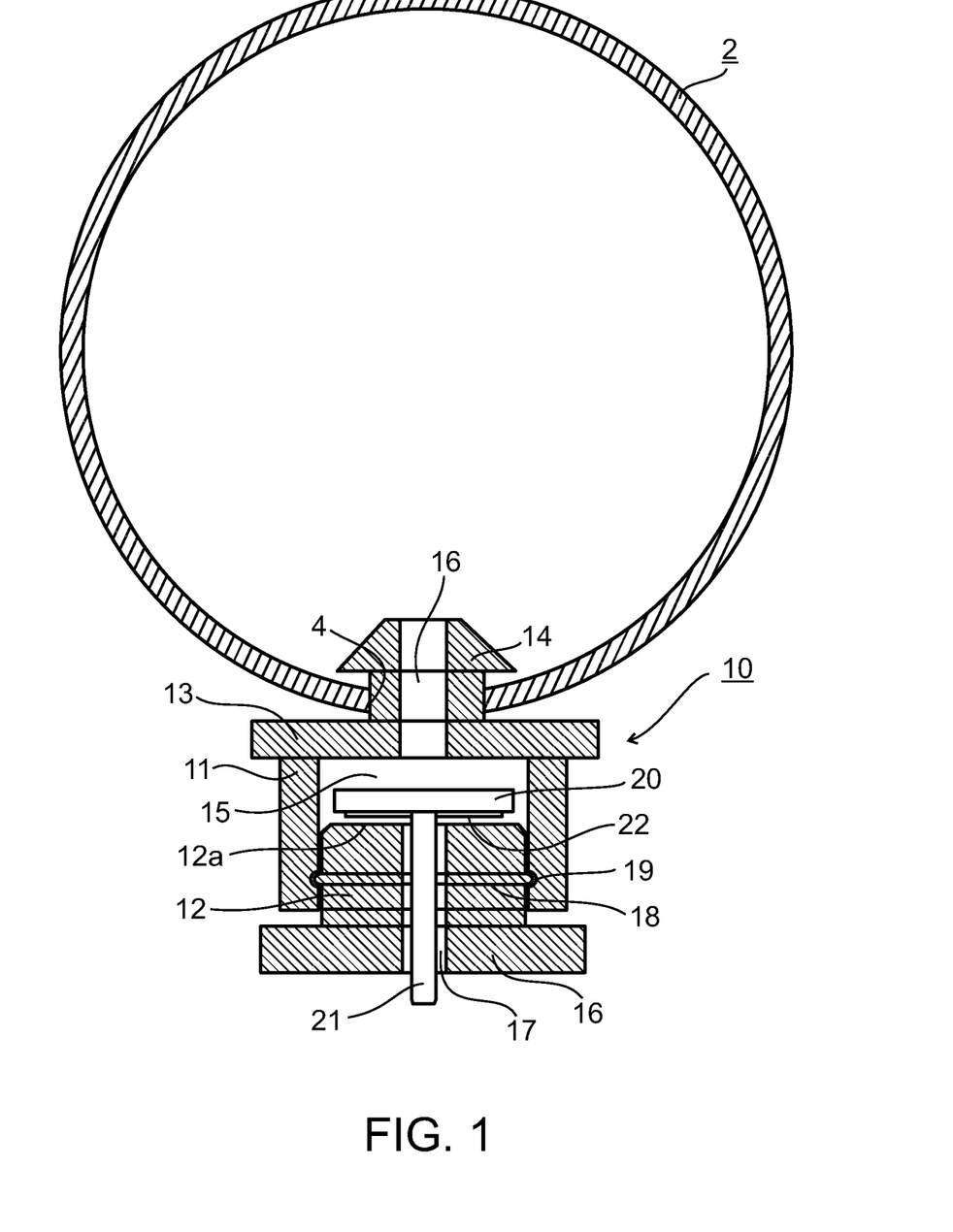
FIG. 1 is a transverse sectional view illustrating one form of drip irrigation emitter constructed in accordance with the present invention wherein the drip-irrigation emitter is applied to the external surface of the irrigation pipe.
Figure 2:
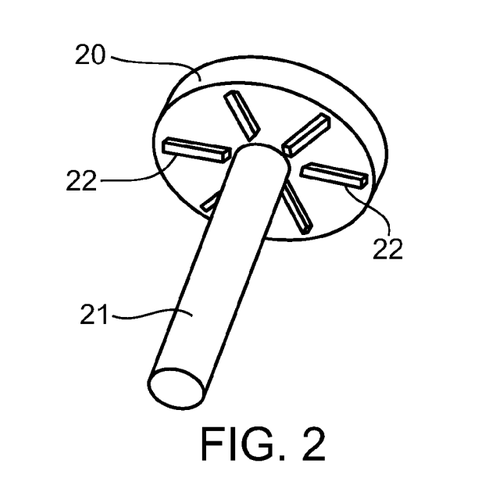
FIG. 2 is a perspective view of the fluid control device or disc within the emitter of FIG. 1.

As shown in FIG. 1, this embodiment of the invention is incorporated in a drip-irrigation emitter, generally designated 10, constructed as an off-line emitter, namely one attachable to the external surface of a drip irrigation pipe, generally designated 2. Thus, as shown in FIG. 1, the drip irrigation pipe 2 is punctured with a plurality of discharge ports 4 (only one of which is seen in FIG. 2) located along the length of the irrigation pipe 2, with a drip irrigation emitter 10 inserted within each discharge port 4 to discharge, to the plants extending along the length of the irrigation pipe, irrigation water at a very slow rate, in this case at a discharge rate of below 0.3 L/hr at normal line pressures, e.g. of 1.5-4 bars. As will be described more particularly below, the illustrated emitter 10 is constructed not only to produce such a microdischarge rate of the irrigation water, but also to enable manual cleaning, in a convenient manner, the micro-passageways in the emitter.

The emitter 10 illustrated in FIG. 1 includes a housing constituted of two parts, namely a first part 11 attachable at one end to the external surface of the irrigation pipe 2, and a second part 12 constructed as a plug insertable into the opposite open end of the first part 11.

Part 11 is in the form of a hollow cylinder open at one end to firmly receive plug 12. Part 11 is formed at its opposite end with an end wall 13 made with a barbed connector 14 irremovably receivable in the respective discharge port 4 in irrigation pipe 2.

The two parts 11, 12 of the housing are constructed so that, when plug 12 is inserted within the open end of part 11, the two parts define a fluid (liquid) chamber 15 between them. Barbed connector 14 is formed with a bore 16 defining an inlet opening to chamber 15 communicating with the interior of irrigation pipe 2. Plug 12 is formed with another bore 17 defining an outlet opening from the emitter 10 communicating with the respective discharge port 4 for discharging water from the irrigation pipe 2 at a slow rate to the plants being irrigated by the irrigation pipe.

Plug 12 further includes a locking ring 18 snapped within a groove extending circumferentially around the outer surface of the plug and receivable within a mating groove 19 formed in the inner sleeve of housing part 11.

The irrigation water flows from the interior of pipe 2 to fluid chamber 15, via bore 16 in the barbed connector 14, of the first housing part 11, and via bore 17 in the second housing part 12, to water the plants being irrigated. This flow is controlled by control member 20 free to move axially along fluid chamber 15 over the outlet opening from that chamber defined by bore 17.

As seen in FIG. 1, flow control member 20 is in the form of a disc of slightly smaller diameter than the inner diameter of fluid chamber 15 so as to be freely movable axially along the chamber upwardly towards the inlet opening of the chamber defined by bore 16, or downwardly over the outlet opening of that chamber defined by bore 17. Flow control disc 20 is integrally formed with a stem 21 extending from the lower surface of disc 20 and receivable within bore 17 of plug 12. As also clearly seen in FIG. 1, stem 21 has a smaller outer diameter than the inner diameter of bore 17, so as to define a sufficient clearance, for discharging the water from chamber 15 outwardly of the irrigation pipe 2 via the respective discharge port 4 to water the plants being irrigated, as well as for the higher flow created when flushing the unit.

Figure 3:
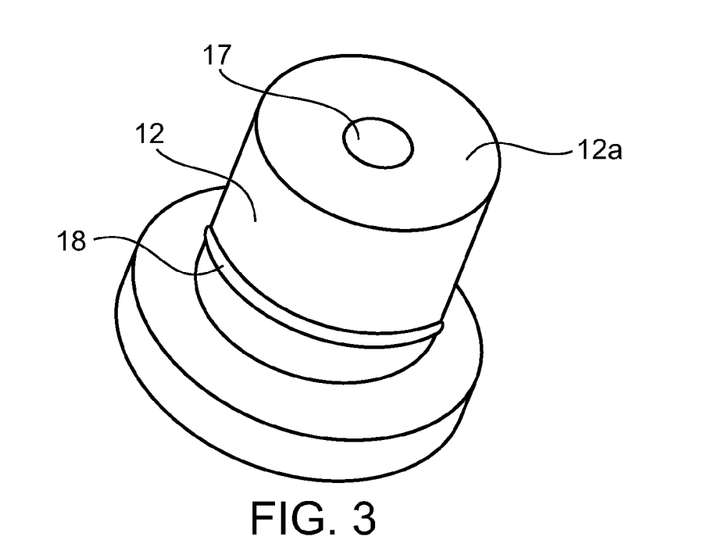
FIG. 3 is a perspective view illustrating the housing and the outlet opening in the emitter of FIG. 1.

As seen particularly in FIGS. 2 and 3, the surface of disc 20 in contact with the outlet opening of chamber 15 defined by bore 17, is formed with a ribbed surface formation 22, including a plurality of radially-extending ribs, in contact the inner flat surface 12a of plug 12, to control the discharge rate of the water from chamber 15 via bore 17. Thus, ribs 22 in the under face of disc 20 define, with flat surface 12a of plug 12, a plurality of small passageways for the water discharged from the irrigation pipe 2. These passageways determine the rate of discharge of the water, and therefore their dimensions and spacing would be designed according to the discharge rate desired for the emitter. As indicated earlier, the illustrated construction permits extremely small discharge rates, below 0.3 L/hr for normal line pressures of 1.5 to 4 bars, thereby making the illustrated drip irrigation emitter particularly useful in micro-drip irrigation systems.

When the illustrated emitter is used in a micro-drip system, there is a larger tendency for the small passageways to become clogged with particulates or other sedimentation within the irrigation water. Such clogging material can be conveniently removed by merely pressing the end of the stem 21 inwardly, which raises disc 20 away from the inner surface 12a of plug 12, to permit the irrigation water to flush-away the clogging particles via bore 17 outwards of the emitter.

The manner of assembling and using the drip irrigation emitter 10 illustrated in FIG. 1 will be apparent from the above description. Thus, the emitter 10 is first assembled by first inserting stem 21 of the flow control disc 20 through bore 17 in plug 12 of the housing, and then applying the plug to the open end of the second part 11 of the housing, producing a snap fit of the locking ring 18. The emitter 10 is then attached to the external surface of irrigation plug 2 by forcing barbed connector 14 through the respective discharge opening 4 in the irrigation pipe.

When the emitter is so assembled and attached to the irrigation pipe, it will be seen from FIGS. 1, 2 and 3 that the two parts 11, 12 of the housing define a fluid chamber 15 having an inlet opening (bore 16 in connector 14) communicating with the interior of the irrigation pipe 2, and outlet opening (bore 17 in the plug 12) communicating with respective discharge port 4. It will also be seen, as soon as the water within irrigation pipe 2 is pressurized, the pressurized water in chamber 15 will force disc 20 downwardly against the outlet opening of the chamber (bore 17), whereupon the ribbed surface configuration 22 formed in the lower face of disc 20, in contact with the flat surface 12a of plug 12, will control the rate of discharge of the water via bore 17 according the dimensions of the ribs.

Whenever it may be desired to clean the emitter of any clogging particles in the passageways defined by the ribs 22, this can be conveniently done by merely pressing the outer end of stem 21 inwardly, which will thereby raise disc 21 with respect to surface 12a, thereby enlarge the passageways and allow water jets that cause such clogging particles to be flushed out through bore 17 outwards of the emitter.

Figure 4:
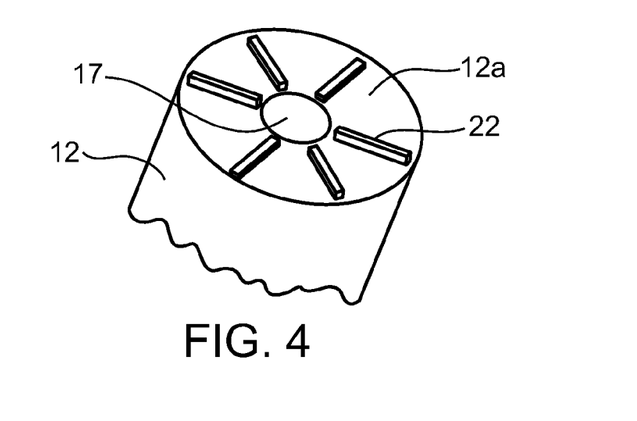
FIG. 4 illustrates a modification in the construction of the device of FIGS. 1-3, wherein the ribbed configuration defining the passageways is formed on the inner surface of the housing.

FIG. 4 illustrates a slight variation, wherein, instead of forming the under surface of disc 20 with the passageway-defining ribs 22, such ribs are formed in the contacting surface 12a of plug 12. The construction and operation of this modification is otherwise the same as described above with respect to FIGS. 1-3.

Figure 5:
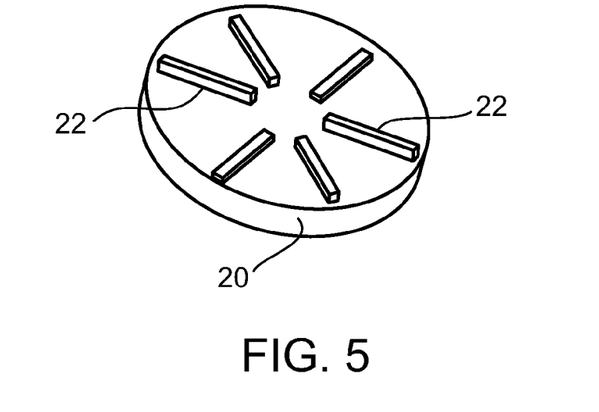
FIG. 5 illustrates another modification in the construction of the drip irrigation emitter of FIGS. 1-3, wherein the fluid control member is not integrally formed with a stem to facilitate flushing the emitter.

FIG. 5 illustrates a further variation wherein the flow control disc 20 within chamber is formed with the ribs 22, but without the stem 21 to facilitate manual declogging the emitter. Such an emitter, however, can be declogged by inserting an implement or just a pin through bore 17 to engage the center of disc 20, to lift the disc and thereby to enlarge the passageway defined by ribs 22, such that the pressurized water within the irrigation pipe 2 will flush out the clogging particles.

Figure 6:
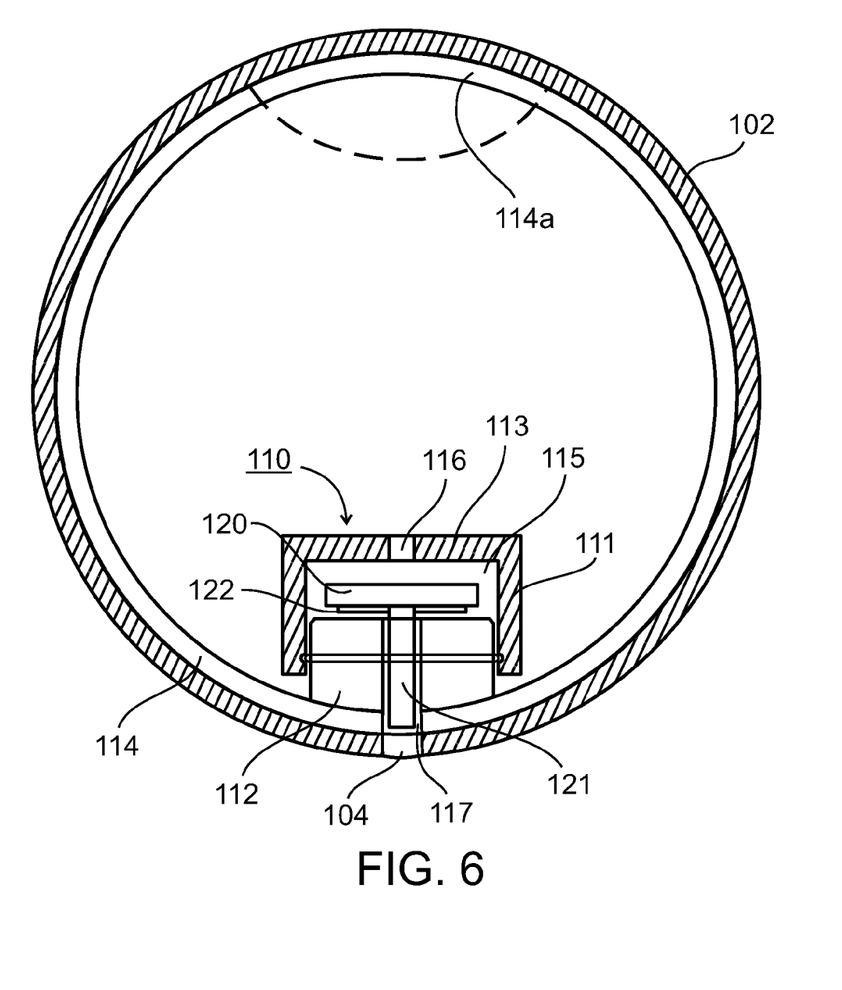
FIG. 6 is a transverse sectional view illustrating another embodiment of the invention, wherein the drip irrigation emitter is applied to the inner surface of the irrigation pipe.
Figure 7:
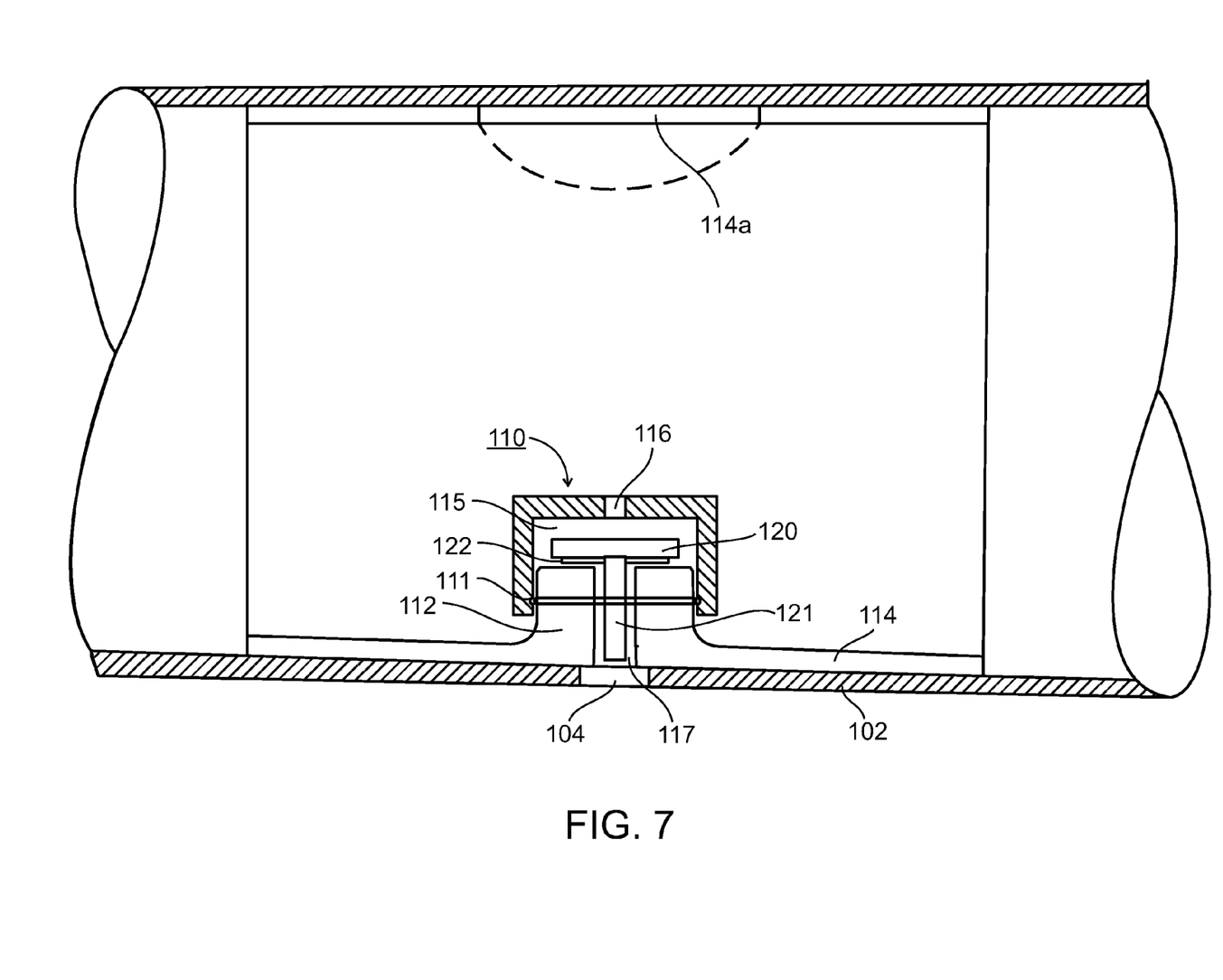
FIG. 7 is a longitudinal sectional view of the drip irrigation emitter of FIG. 6.

The Embodiment of FIGS. 6 and 7

FIGS. 6 and 7 illustrate a drip irrigation emitter, generally designated 110, constructed in accordance with the present invention to be applied internally of the irrigation pipe 2 for controlling the rate of discharge of water from each of the discharge ports 4. Such an arrangement is frequently called an "in-line" emitter construction, or an "integral" emitter construction.

Thus, as shown in FIGS. 6 and 7, the emitter generally designated 110, also includes a housing consisting of two parts, namely a cylindrical part 111 formed with an open end, and a plug, part 112, receivable within the open end of the cylindrical part. In this case, however, the emitter is attached to the interior of the irrigation pipe 102 via the plug part 112 of the housing, which plug part is integrally formed with a cylindrical sleeve 114 receivable within the interior of the irrigation pipe and in firm contact with its inner surface. To facilitate the assembly of the cylindrical part 111 onto plug part 112, sleeve 114 is formed with a cutout, schematically shown at 114a. It will thus be seen that plug 112 and housing part 111 also define a chamber 115 between the two parts corresponding to chamber 15 in FIG. 1. The covered end 113 of housing part 111 is formed with an opening 116 defining an inlet to chamber 115 communicating with the interior of irrigation pipe 102; and plug 112 is formed with a bore 117 defining the outlet opening of chamber 115 communicating with the respective discharge port 104 (4, FIG. 1).

As also present in the embodiment of FIGS. 1-5, chamber 115 includes a flow control disc 120 integrally formed, at its lower surface, with a stem 121 extending through bore 117. In addition, the under face of disc 120 is formed with a ribbed surface configuration 122, similar to that illustrated in FIG. 2 at 22, for controlling the flow of water from chamber 115 out through bore 117 and discharge plug 104 at a desired slow rate.

As distinguished from the embodiment illustrated in FIGS. 1-5, in the embodiment of FIGS. 6 and 7 the stem 121 integrally formed with flow control disc 120 terminates short of the inner surface of irrigation pipe 102. Thus, in the embodiment of FIGS. 6 and 7, there are no projecting surfaces from the irrigation pipe 102, so that the irrigation pipe can be wound, stored, and applied in a conventional manner as commonly followed with respect to integrated-emitter type irrigation pipes.

The embodiments of FIGS. 6 and 7, however, can be manually cleaned in the same manner as described above with respect to the embodiment of FIGS. 1-5, by merely inserting an implement or pin through discharge port 104 and bore 107 to engage the center of control disc 120 and to lift it off of the upper surface 112a of plug 112. The emitter 110 illustrated in FIGS. 6 and 7 would be first assembled, in the manner described above with respect to FIGS. 1-5, except that the assembled emitter would be applied to the irrigation pipe 102 at the time of extrusion of the irrigation pipe. In substantially all other respects, the emitter 110 illustrated in FIGS. 6 and 7 would be constructed, and used, in substantially the same manner as described above with respect to FIGS. 1-5.

Some Variations

Figure 8:
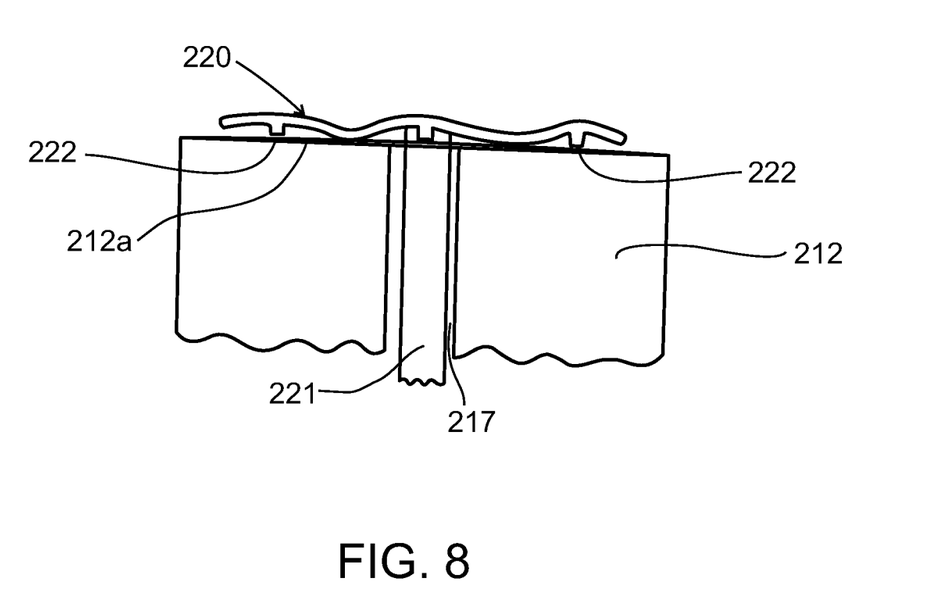
FIG. 8 illustrates a modification applicable to both of the above-described embodiments, wherein the fluid control member is a disc of an elastomeric material to provide pressure compensation for the emitter.

FIG. 8 illustrates a variation applicable to either of the above-described embodiments of FIGS. 1-7 to provide pressure compensation for the discharge from the emitter according to the pressure within the interior of the irrigation pipe. Because the pressure of the water within the irrigation pipe along the length of the pipe varies, e.g. because of pressure drop due to the flow along the length of the pipe or because of different elevation points due to the topography of the ground on which the pipe rests, such pressure compensation better assures a more uniform discharge of the irrigation water along the length of the pipe.

Thus, as seen in FIG. 8, the control disc 220 overlying the bore 217 in the base member 212 is made of an elastomeric material which deforms according to the local pressure within the irrigation pipe (102, FIG. 6). This local pressure equals the pressure in the control chamber (e.g. 115, FIG. 6), to thereby control the sizes of the passageways defined by its underlying ribs 222 engaging the flat surface 212a of the base member 212. In this modification, the elastomeric control disc 220 includes a stem 221 passing through bore 217 in base member 212, but it will be appreciated that, as in the modification illustrated in FIG. 5, such a stem is not necessary. Thus, a relatively high pressure within the irrigation pipe and the control chamber will deform elastomeric disc 220 to decrease the size of the passageways, and therefore compensate the discharge rate of water via bore 217 to the discharge port (e.g. 104, FIG. 6) of the irrigation pipe.

The relationship of the rate of water discharge from said drip emitter to the dimensions of said passageways and the water pressure is derived from Bernoulli's law, Eqn. 1:

$$P_1 + \rho\frac{v_1^2}{2} + \rho g h_1 = P_2 + \rho\frac{v_2^2}{2} + \rho g h_2 \tag{1}$$

For the case of the novel drip emitter of the present invention, let $P_1=P$ be the pressure in the irrigation tube and $P_2=0$ be the pressure at the orifice, for a tube placed horizontally the gravity terms $\rho g h$ can be dropped and because the water velocity inside the tube is much smaller than the velocity through the orifice $v_1$ can be ignored with respect to $v_2$. Eqn. 1 then becomes:

$$P = \rho\frac{v_2^2}{2} \tag{2}$$

The flow rate Q through the orifice is related to its cross sectional area A by $Q=A \cdot v_2$ and using Eqn. 2 for $v_2$ we have:

$$Q=A\sqrt{(2P/\rho)} \tag{3}$$

Setting units:
P [bar]=$10^6$ [gr]/[cm·s$^2$], $\rho$=1.0[gr/cm$^3$], Then: [P/$\rho$]=$10^6$ [cm$^2$/s$^2$], and: [Q]=[cm$^2$]·(2·$10^6$ [gr]/[cm·s$^2$]/[gr/cm$^3$])$^{1/2}$= [cm$^3$/s]

Using these units for water, $\rho$=1.0[gr/cm$^3$], the flow is related to orifice area and pressure by:

$$Q[cm^3/s]=A[cm^2]1.4\times10^3\sqrt{P[bar]} \tag{4}$$

Example 1

For a round orifice of diameter 1.0 mm the cross sectional area is 0.00785 cm$^2$. Under a pressure of 2.0 bars the flow rate is obtained: Q=15.7 cm$^3$/s=56.5 L/h.

Example 2

For the same size round orifice of diameter D=1.0 mm, covered by a slab having 6 radial ribs each protruding h=0.005 mm and width w=0.4 mm of its face, the gateway cross sectional area is: ($\pi$D-4w)h=3.7×10$^{-5}$ cm$^2$. Under a pressure of 2 bars the flow rate is obtained: Q=3.7×10$^{-5}$· (1.4·10$^3$·1.4)=0.074 cm$^3$/s=0.27 L/h. This flow rate is in compliance with the discharge known as "Micro-Drip".

While the invention has been described with respect to several preferred embodiments, it will be appreciated that these are set forth merely for purposes of example. Thus, the illustrated flow control device could be used for controlling the flow of other fluids, particularly where very low discharge rates are desirable. In addition, other surface configurations could be used, between the control disc and/or base member to define the passageways for the outflow of the fluid. Many other modifications, variations and applications of the invention will be apparent.

What is claimed is:

1. A fluid flow control device for controlling the discharge of a pressurized fluid from a discharge port in a fluid conduit, comprising:

a housing attachable to said fluid conduit and constructed to define a fluid chamber having an inlet opening communicating with the interior of said fluid conduit, and an outlet opening for discharging fluid from the fluid conduit;

and a flow control member freely movable within said fluid chamber and having a surface contacting an inner surface of said housing to control the flow of fluid from said fluid chamber out of the fluid conduit via said outlet opening in the housing;

characterized in that at least one of said contacting surfaces of the flow control member and housing is formed with a protruding pattern defining between the two contacting surfaces small passageways for the flow of fluid from the fluid chamber out through said outlet opening in the housing, and in that said flow control member is manually accessible, via said outlet opening in the housing, to be manually moved away from the other of said contacting surfaces and thereby to flush said passageways of any clogging particles, thereby enabling said fluid flow control device to perform the double function of (a) continuously restricting the fluid flow from the fluid chamber through said small passageways out through said outlet opening in said fluid conduit, and (b) whenever desired, enlarging said small passageways by manually pressing said manually-accessible flow control member inwardly of said fluid conduit to thereby clear said small passageways of any clogging material.

2. The device according to claim 1, wherein said housing is attachable to the external surface of said fluid conduit and said fluid chamber communicates with the interior of said fluid conduit via an inlet opening in said housing.

3. The device according to claim 2, wherein said housing includes a barbed connector for attachment to the external surface of said fluid conduit, said barbed connector including a bore therethrough defining said inlet opening of the fluid chamber communicating with the interior of the fluid conduit.

4. The device according to claim 3, wherein said housing includes:
a body member integrally formed with said barbed connector at one end and open at its opposite end; and
a plug receivable within said open end of the body member and formed with a bore defining said outlet opening of the fluid chamber communicating with said discharge port of the fluid conduit.

5. The device according to claim 4, wherein said flow control member is a disc integrally formed with a stem receivable within, and of smaller diameter than, said bore in said plug, to enable manual movement of said flow control member for flushing said passageways.

6. The device according to claim 5, wherein said stem is of a length to project outwardly through said discharge port to provide convenient access to a user for moving said flow control member to flush said passageways.

7. The device according to claim 5, wherein said small passageways are defined by an annular array of radially extending ribs.

8. The device according to claim 1, wherein said housing is attachable to the inner surface of the fluid conduit and said fluid chamber communicates with the interior of said flow conduit via an inlet opening in said housing.

9. The device according to claim 8, wherein said housing is attachable to the inner surface of the fluid conduit by a cylindrical sleeve carrying said housing and receivable within said fluid conduit in contact with its inner surface.

10. The device according to claim 9, wherein said housing includes a first part integrally formed with said sleeve and further formed with a bore defining said outlet opening of the fluid chamber, and a second part having an open end receiving said first part and a covered end formed with said inlet opening in the housing communicating with the interior of said fluid chamber.

11. The device according to claim 10, wherein said fluid control member is a disc integrally formed with a stem located within, and of smaller diameter than, said bore in said second part, to enable manual movement of said fluid control member for flushing said passageways.

12. The device according to claim 11, wherein said stem is of a length to terminate short of the inner surface of said fluid conduit but is accessible by an implement inserted through said discharge port and bore in said first part to flush said passageways.

13. The device according to claim 11, wherein said small passageways are defined by an annular array of radially extending ribs.

14. The device according to claim 1, wherein said fluid control member is a disc of elastomeric material deformable under pressure to control the size of said passageways in accordance with the pressure of the fluid within said fluid conduit.

15. The device according to claim 1, where said fluid control device is a drip irrigation emitter, and said fluid conduit is a water irrigation pipe.

16. A fluid conduit, including a plurality of discharge ports spaced along its length, and a plurality of fluid control devices each according to claim 1 applied to said discharge ports to control the discharge of fluid from the fluid conduit.

17. The fluid conduit according to claim 16, wherein the fluid conduit is a water irrigation pipe, and said plurality of flow control devices are drip-irrigation emitters applied to said discharge ports to control the discharge of irrigation water from the water irrigation pipe.

* * * * *